US007804836B2

(12) United States Patent
Hyldgaard

(10) Patent No.: US 7,804,836 B2
(45) Date of Patent: Sep. 28, 2010

(54) PROCESSING ENCODED REAL-TIME DATA

(75) Inventor: Kim Hyldgaard, Sunds (DK)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 213 days.

(21) Appl. No.: 12/065,060

(22) PCT Filed: Sep. 1, 2005

(86) PCT No.: PCT/EP2005/009421

§ 371 (c)(1),
(2), (4) Date: Mar. 12, 2008

(87) PCT Pub. No.: WO2007/025561

PCT Pub. Date: Mar. 8, 2007

(65) Prior Publication Data

US 2008/0240108 A1 Oct. 2, 2008

(51) Int. Cl.
*H04L 12/28* (2006.01)

(52) U.S. Cl. ..................................................... 370/394

(58) Field of Classification Search ....................... None
See application file for complete search history.

(56) References Cited

U.S. PATENT DOCUMENTS 4,357,674 A * 11/1982 Ikeda et al. ................. 708/670
6,584,104 B1 * 6/2003 McGowan .................. 370/394
7,317,353 B2 * 1/2008 Hayase ...................... 330/149
2002/0133764 A1 * 9/2002 Wang ........................ 714/707
2004/0210329 A1 * 10/2004 Chen et al. .................... 700/94
2005/0044471 A1 * 2/2005 Chia et al. .................. 714/776
2005/0049853 A1 * 3/2005 Lee et al. .................... 704/201
2005/0093606 A1 * 5/2005 Kaiser ........................ 327/308

FOREIGN PATENT DOCUMENTS

GB 1 528 954 A 10/1978

OTHER PUBLICATIONS

Perkins C et al; "A Survey of Packet Loss Recovery Techniques for Streaming Audio" IEEE Network. IEEE Service Center, New York, NY, US vol. 12, No. 5, Sep. 1998, pp. 40-48, XP000875014 ISSN: 0890-8044 p. 41, left-hand column, line 6-line 26 p. 45, right-hand column, line 14-line 25.

* cited by examiner

*Primary Examiner*—Hong Cho
*Assistant Examiner*—Ajay P Cattungal
(74) *Attorney, Agent, or Firm*—Roger S. Burleigh

(57) ABSTRACT

A processing device and method for processing packets of encoded real-time data to perform a gradual fade-out and fade-in of a signal. Upon detecting the beginning of a packet loss period, a last correctly received packet is repeated with gradually increased attenuation to slowly fade out, for example, an audio signal. At the end of the packet loss period, the device slowly fades in the signal by attenuating the first or a number of packets received following the loss period. The method may be performed with low complexity by decrementing segment numbers of samples of data packets such as in a lookup operation.

20 Claims, 6 Drawing Sheets

PROCESSING ENCODED REAL-TIME DATA

FIELD OF THE INVENTION

The present invention relates to processing packets of encoded real-time data.

BACKGROUND OF THE INVENTION

Telephone networks are well suited for supporting real time communication by establishing a dedicated communication link between a calling party and a called party. Information such as voice information is transmitted via the dedicated communication link between the communicating parties. As opposed thereto computer networks often do not establish a dedicated communication link between communicating devices but rather transmit data packets containing payload information between the communicating devices through the network. Such type of packet transmission was not originally designed to handle real time communications, as packets may have varying transmission delays. Packet-switched networks were rather designed to exchange data between computing devices with a data exchange not under real-time requirements.

In a packets switched network the individual data packets indicate the desired recipient and are transmitted via the communication network along the same path or via different paths. At the receiving party the data packets are collected and the communicated information is extracted. In order to be able to properly assemble the original information content, the individual data packets are numbered sequentially so that the receiving party is able to arrange the received data packets into the proper sequence for further processing. A well-known example of a packet-switched communication network is the Internet.

However, with the merging of telecommunication networks required to support real time communications and computer networks, the real-time requirement also applies to the transmission of data through the packet-switched communication network.

A variety of protocols exists for supporting real-time data transfer in packet-switched networks, one of which is RTP (Real-time Transfer Protocol) to transmit real-time data in packets in IP networks. RTP splits a stream of real-time data such as video or audio streams into small frames and appends a sequence number and a time stamp to each frame. The frames are then transmitted in the packet-switched network.

When the packets are received it is possible to recreate the original stream by using the time stamp and the sequence number of the individual received packets. RFC 3550 "RTP: A Transport Protocol for Real-Time Applications" and RFC 3551 "RTP Profile for Audio and Video Conferences with Minimal Control" by the Internet Engineering Task Force (IETF) describe different payload formats for use in the RTP protocol. These payload formats are called the μ-law and the A-law encoding, with μ-law known as PCMU with payload type number 0 and A-law known as PCMA with payload type number 8.

In real-time packet transmission applications problems occur if packets are corrupted or lost on their way from the transmitting entity to the receiving entity. In this case, the receiving entity cannot simply wait for a re-transmission of a lost or corrupted data packet, and dropouts of the transmitted signal occur. To cover up for lost packets, the receiver applies techniques known as packet loss concealment, e.g. in the transmission of video or audio streams. Examples of packet loss concealment algorithms are described in ITU-T Recommendation G.711 Appendix (09/99) A high quality low-complexity algorithm for packet loss concealment with G.711.

However, the above algorithms for packet loss concealment are very performance demanding and typically require a hardware design with a dedicated digital signal processor which is handling error concealment tasks.

In environments lacking a dedicated processor or high performance processor, error concealment algorithms therefore cannot be applied, in which case the audible effects of packet loss, such as abrupt silence or repetition of a lost packet may be quite annoying for the communicating parties.

SUMMARY OF THE INVENTION

It is therefore desirable to provide for an efficient processing of packets of real-time data for packet loss concealment.

This object of the invention is solved by a processing device for processing packets of encoded real-time data, including receiving means for receiving a sequence of packets of encoded real time signal samples from a sending entity, each sample having a segment number and a data value, the segment number specifying one of a plurality of adjacent sub-ranges of a range of possible signal values, and the data value indicating an element in the sub-range specified by the segment number; and attenuating means for attenuating the samples of a packet by decrementing the segment number of each sample of the packet by the same decrement value to specify a lower sub-range corresponding to lower possible signal values. Accordingly, real-time signals such as audio signal can be attenuated by modifying the segment numbers to specify lower possible signal values, thus reducing computing requirements for the attenuation operation. Decrementing the segment number is a low-complexity operation that can be handled by dedicated hardware or general purpose processing elements. For example, in case a data packet of the encoded real-time data is received improperly, partially corrupted or contains undesired content, the real-time data payload can be attenuated to lessen undesired audible effects.

According to an advantageous embodiment, reception means are provided for detecting a packet loss period, the packet loss period corresponding to at least one lost or improperly received packet, and for introducing into the sequence of packets a sequence of at least one repetition copy of the last correctly received packet, if a packet loss period is detected; and wherein the packet attenuated by the fade means is a repetition copy. Accordingly, upon detecting a packet loss period, a last correctly received packet can be attenuated and repeated in the packet loss period to reduce audible effects of the packet loss period.

The attenuation means may be arranged to progressively decrement the segment numbers for the sequence of repetition copies of the last correctly received packet by increasing decrement values. Accordingly, a sequence of attenuation copies can be gradually attenuated to gradually fade out the audible signal.

If the segment number corresponds to a lowest sub-range, a corresponding data value can be replaced by zero. Accordingly, after reaching a lowest possible segment number, a corresponding sample can be replaced by silence.

According to another embodiment the sample segment numbers of at least one of the repetition copies is decremented by the same decrement value, thus enabling adjusting the fadeout period after a packet loss is detected. A selectable number of repetition copies can be attenuated by the same factor, leading to a shorter or longer fadeout period.

According to another embodiment, the number of repetition copies decremented by the same decrement value depends on the real-time duration of the payload data of a packet, thus enabling adjusting the fadeout period based on the payload data duration.

According to another embodiment, the first repetition copy is not attenuated, i.e., simply repeated.

According to another embodiment, the receiving means is further adapted to detect a first packet after a packet loss period; and the packet attenuated by the attenuating means is the first packet after the packet loss period. Accordingly, after a packet loss period, a first correctly received packet may be attenuated in order to reduce the audible impact of an abrupt and of a packet loss period.

According to another embodiment, the attenuating means is arranged to decrement the segment numbers of the samples of packets subsequent to the first packet after the packet loss period by a smaller decrement value compared to the first packet. Accordingly, a fade-in period may be defined, slowly fading in the signal after a packet loss period.

According to another embodiment, lookup means are provided for holding a lookup table of all possible sample values for each attenuation decrement value; and for performing the attenuation of the PCM samples by looking up a sample value at a position corresponding to an original sample value in a lookup table corresponding to a desired attenuation decrement value. Accordingly, as the lookup tables can be prepared beforehand, an actual attenuation operation only is constituted by a lookup operation of a corresponding sample value decremented by a certain decrement value, further reducing computational complexity.

According to another embodiment, a method is provided for processing packets of encoded real-time data, including receiving a sequence of packets of encoded real-time signal samples from a sending entity, each sample having a segment number and a data value, the segment number of a sample specifying one of a plurality of adjacent sub-ranges of a range of possible signal values, and a data value indicating an element in the sub-range specified by the segment number; and attenuating the samples of a packet by decrementing the segment number of each sample of the packet by the same decrement value to specify a lower sub-range corresponding to lower possible signal values.

According to another embodiment, a program is provided having instructions to carry out the method.

A computer-readable medium may be provided in which a program is embodied, wherein the program is to make a computing device to execute the method.

A computer program product may be provided comprising the computer-readable medium.

DETAILED DESCRIPTION OF THE PREFERRED EMBODIMENTS

Figure 1:
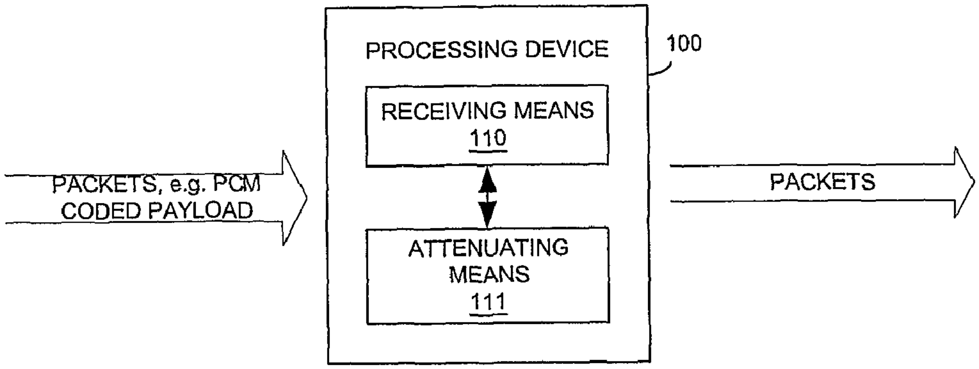
FIG. 1 illustrates elements of a processing device for processing packet of encoded real-time data according to an embodiment of the invention.

FIG. 1 illustrates elements of a processing device for processing packets of encoded real-time data according to an embodiment of the invention.

FIG. 1 shows a processing device 100 for processing a stream of encoded real-time data packets in a real-time application such as a voice or video stream over a communication network. The processing device comprises receiving means 110 for receiving a sequence of the packets of encoded real-time signal samples from a sending entity. Each sample of each packet has a segment number and a data value, wherein the segment number specifies one of a plurality of adjacent sub-ranges of a range of possible signal values. For example, the original signal such as an audio signal has a certain range of possible signal values with certain associated amplitude. This range of possible signal values is subdivided into a number of sub-ranges. The data value indicates an element in the sub-range specified by the segment number, i.e., the data value specifies a value of the original signal within the sub-range defined by the segment number. The sub-ranges thus defined may cover equal size portions of the range of signal values of the original signal such as an audio signal, or may cover segments of varying sizes. For example, the sub-ranges may be sized according to a logarithmic scale, with the sub-ranges corresponding to the smallest signal values having the smallest sizes, and the sub-ranges of increasing signal values having increased sizes. Sub-ranges arranged according to a logarithmic scale correspond to human hearing.

As the original signal such as an audio signal may have positive and negative signal amplitude, the logarithmic scale for sizing the sub-ranges is applied starting from the value 0 in positive and negative amplitude direction.

One example of a technique for coding an original signal into samples having segment numbers and data values is PCM (Pulse Code Modulation). More precisely, a PCM encoded data signal provides samples having 8 bits, the first bit being a sign bit, the second to fourth bit constituting the segment number, and the fourth to eighth bit constituting the data value. PCM provides two different techniques to code a signal, the μ-law and the A-law techniques, differing from one another in the way the segment numbers are consecutively numbered. The μ-law encoding provides the lowest segment number as 111, i.e., counting up the segment numbers corresponds to decrementing the binary value 111. The A-law encoding provides the lowest segment number as 101, according to the A-law encoding even bits have been inverted and thus the first bit of the sample (the sign value) is inverted, the second bit of the segment number is inverted, etc.

PCM is applied in the RTP (Real-time Transport Protocol) to transmit payloads of real-time encoded data via a packet-switched network. PCM and RTP are well-known in the art.

While the invention may be advantageously implemented to handle PCM encoded RTP payloads, it is explicitly noted that the invention may be applied to any other protocol using the above outlined concept of segment numbers and data values.

Further to the receiving means 110 the processing device 100 comprises attenuating means 111 for attenuating the samples of a packet of the stream of real-time encoded packets by decrementing the respective segment numbers of each sample of the packet by the same decrement value to specify a lower sub-range corresponding to lower possible signal values. Accordingly, the processing device receives a stream of data packets, such as PCM encoded RTP payload packets, and attenuates at least one of the packets by decrementing the segment numbers of the samples of this packet. The attenuation operation decrements the segment numbers, and thus avoids a complex recalculation, e.g. of the individual data values. Specifying a lower sub-range corresponding to lower possible signal values will, for positive signal values, involve specifying a sub-range corresponding to values of the original signal closer to zero as compared to the original sub-range. Correspondingly, specifying a lower sub-range corresponding to lower possible signal values for negative original signal values corresponds to specifying a sub-range corresponding to signal values of the original signal closer to zero from the negative direction as compared to the original sub-range.

Decrementing the segment number to specify such lower sub-range defines an operation to modify the segment number to specify such lower segment value. The actual operations to be carried out to perform the decrementing of the segment numbers by the decrement value therefore depends on the particular coding scheme used, such as PCM μ-law and A-law and the particular bit combinations assigned to the respective sub-ranges.

As noted above, each sample of the data packet to be attenuated is processed by decrementing the segment number or modifying the segment number to specify a lower sub-range corresponding to lower possible signal values. According to the PCM μ-law and A-law coding the segment numbers comprise 3 bit values, and accordingly a number of 8 different segment numbers can be specified. With different segment numbers 8 different sub-ranges can be defined and in the attenuation operation now each original sub-range of a sample is replaced by a sub-range, being a certain step size or "decrement value" lower than the original sub-range. If the decrement value is one, it specifies the respective next lower sub-range, calculated from the original segment number of a sample. The decrement value may also be 2, 3, 4, to specify other lower sub-ranges, i.e. second lower, third lower, fourth lower sub-range. Obviously the segment number cannot be set lower than the lowest decrement number and thus, if a decrementing operation would lead to a segment number lower than the lowest segment number, the lowest segment number may be selected or the respective sample may be replaced by values corresponding to 0.

The above embodiment may be used in a system for receiving audio data packets between two communicating parties, such as a telephone communication network. As noted earlier, each packet is provided with a sequence number and a time stamp, enabling the receiving party to assemble any received packets in an order corresponding to the original sequence. However, particularly in case the communication involves wireless transmissions, some of the data packets may at least be corrupted and payload data may not be fully recoverable. Accordingly, in order to reduce any detrimental audible effects of the degenerated signal, a correspondingly impaired packet is attenuated as outlined above, i.e., all individual segment numbers of the packet all reduced to specify correspondingly lower sub-ranges as compared to the original segment numbers.

Therefore, if transmission problems occur or for any other reason the output signal should be attenuated, one or a plurality of packets can be e.g. progressively attenuated to slowly fade out the signal or afterwards to slowly fade in the signal after the reduction period is over. As the fading or attenuating of the signal can be performed by simply decrementing the segment numbers of the respective packets to be faded out or faded in, computational complexity of fading operations are low and processing capacity can be saved.

Accordingly, the processing device may be constituted by a general purpose processing device such as commonly used in telephone or video applications. Nevertheless it is also possible that the processing device 100 is a dedicated processing device, specialized for handling the above outlined operations of attenuating signal values by decrementing segment numbers.

The processing device may form part of a communication device, such as a mobile telephone or wire-line telephone, for receiving a stream of encoded real-time packets from a sending entity via a packet-switched communication network. In this case the processing device forwards the stream of packets, after attenuating at least one of the packets, to further processing elements for reproduction to a user.

Alternatively the processing device 100 forms part of a communication network, such as at a network node, and a stream of packets is received from a sending entity and forwarded to a receiving entity via the communication network. For example the network node is positioned at a transition point between a packet switched transmission and a communication network with dedicated communication links.

Figure 2:
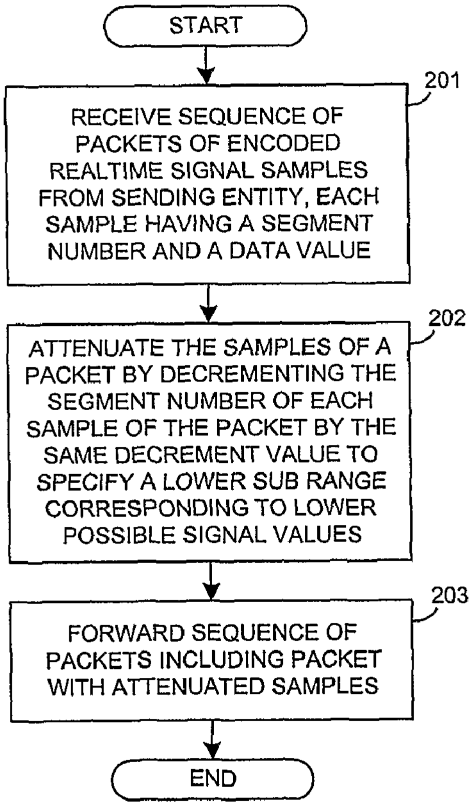
FIG. 2 illustrates operations of a method for processing packets of encoded real-time data according to an embodiment of the invention.

In the following, a further embodiment of the invention will be described with regard to FIG. 2. FIG. 2 illustrates operations of a method for processing encoded real-time data packets, e.g. with the hardware structure of FIG. 1.

In a first operation 201 a processing device receives a sequence of packets of encoded real-time signal samples from a sending entity, each sample having a segment number and a data value, as outlined before. Prior to receiving or after the receiving operation 201, any required pre-processing operations can be carried out to obtain a signal useful for further processing as required.

In an operation 202 the samples of a packet of the stream of packets are attenuated by decrementing the segment numbers of each sample of the packet by the same decrement value to specify a lower sub-range of signal values corresponding to lower possible signal values of the original signal. As all segment numbers are decremented by the same decrement value, instead of the original sub-range, correspondingly lower sub-ranges are indicated and a correspondingly lower signal output is generated, leading to an attenuation or fading of a corresponding packet.

The attenuation of operation 202 can be performed for packets, which do or are expected to contain an information content, which should be attenuated, e.g. if the packet is partially corrupted via transmission or if it is expected that the packet contains fade out information which needs to be attenuated, such as background noise or similar. Accordingly, the processing device or a cooperation device may be provided for monitoring the incoming packets or information associated with the incoming packets indicating the requirement for attenuation. Upon detecting such requirement for attenuation in association with a particular packet, the processing device could then be instructed to perform the above outlined operation 202, e.g. by means of the attenuating means 111.

Thereafter, in an operation 203 the sequence of packets including packets with the attenuated samples is forwarded to a receiving entity, such as a user of a telephone device, or a further entity of a network.

In the following, an illustrating example for attenuating a packet of PCM encoded RTP packets is described. As noted earlier, for attenuating a packet with payload information corresponding for example to 20 ms of real-time coded audio information, each sample of the packet is obtained and the segment number is decremented by a certain decrement value to lower possible signal values, thus providing an attenuated version of the original packet.

Moreover, as noted earlier, each PCM sample consists of 8 bits, the first bit being the sign bit, the 2nd to 4th bit the segment number and the 4th to 8th bit the data value. Accordingly, each sample can take one of 256 possible bit combinations that can for example be represented in hexadecimal notation.

The present example provides for lookup tables of all possible sample values for each attenuation decrement value; enabling to perform the attenuation or decrementing of the segment numbers of the samples by a lookup operation, i.e. by looking up a sample value at a lookup table position corresponding to an original sample value in a lookup table corresponding to a desired attenuation decrement value.

To further explain the lookup procedure an example of all 256 possible values of an input data sample of the incoming data stream in hexadecimal notation is shown in Table 1:

TABLE 1

| Input byte value | | | | | | | | | | | | | | | |
|---|---|---|---|---|---|---|---|---|---|---|---|---|---|---|---|
| 00 | 01 | 02 | 03 | 04 | 05 | 06 | 07 | 08 | 09 | 0a | 0b | 0c | 0d | 0e | 0f |
| 10 | 11 | 12 | 13 | 14 | 15 | 16 | 17 | 18 | 19 | 1a | 1b | 1c | 1d | 1e | 1f |
| 20 | 21 | 22 | 23 | 24 | 25 | 26 | 27 | 28 | 29 | 2a | 2b | 2c | 2d | 2e | 2f |
| 30 | 31 | 32 | 33 | 34 | 35 | 36 | 37 | 38 | 39 | 3a | 3b | 3c | 3d | 3e | 3f |
| 40 | 41 | 42 | 43 | 44 | 45 | 46 | 47 | 48 | 49 | 4a | 4b | 4c | 4d | 4e | 4f |
| 50 | 51 | 52 | 53 | 54 | 55 | 56 | 57 | 58 | 59 | 5a | 5b | 5c | 5d | 5e | 5f |
| 60 | 61 | 62 | 63 | 64 | 65 | 66 | 67 | 68 | 69 | 6a | 6b | 6c | 6d | 6e | 6f |
| 70 | 71 | 72 | 73 | 74 | 75 | 76 | 77 | 78 | 79 | 7a | 7b | 7c | 7d | 7e | 7f |
| 80 | 81 | 82 | 83 | 84 | 85 | 86 | 87 | 88 | 89 | 8a | 8b | 8c | 8d | 8e | 8f |
| 90 | 91 | 92 | 93 | 94 | 95 | 96 | 97 | 98 | 99 | 9a | 9b | 9c | 9d | 9e | 9f |
| a0 | a1 | a2 | a3 | a4 | a5 | a6 | a7 | a8 | a9 | aa | ab | ac | ad | ae | af |
| b0 | b1 | b2 | b3 | b4 | b5 | b6 | b7 | b8 | b9 | ba | bb | bc | bd | be | bf |
| c0 | c1 | c2 | c3 | c4 | c5 | c6 | c7 | c8 | c9 | ca | cb | cc | cd | ce | cf |
| d0 | d1 | d2 | d3 | d4 | d5 | d6 | d7 | d8 | d9 | da | db | dc | dd | de | df |
| e0 | e1 | e2 | e3 | e4 | e5 | e6 | e7 | e8 | e9 | ea | eb | ec | ed | ee | ef |
| f0 | f1 | f2 | f3 | f4 | f5 | f6 | f7 | f8 | f9 | fa | fb | fc | fd | fe | ff |

The PCM RTP coding scheme provides for two different coding techniques, μ-law and A-law, differing in the way in which bits of the segment numbers are associated with subranges of the range of possible signal values.

As for each of the coding schemes, μ-law and A-law, 8 different segment numbers are possible, and a corresponding number of 8 attenuation levels corresponding to 8 different decrement values, it becomes possible to prepare a lookup table for obtaining samples with decremented segment numbers.

More precisely, for each decrement value or attenuation level a lookup table can be prepared for all possible samples. For example, a lookup table for the μ-law coding scheme for a step size or decrement value of 1 or a first attenuation level can be created, as shown in table 2 below.

TABLE 2

| Output μ-law value - fading segment by one | | | | | | | | | | | | | | | |
|---|---|---|---|---|---|---|---|---|---|---|---|---|---|---|---|
| 10 | 11 | 12 | 13 | 14 | 15 | 16 | 17 | 18 | 19 | 1a | 1b | 1c | 1d | 1e | 1f |
| 20 | 21 | 22 | 23 | 24 | 25 | 26 | 27 | 28 | 29 | 2a | 2b | 2c | 2d | 2e | 2f |
| 30 | 31 | 32 | 33 | 34 | 35 | 36 | 37 | 38 | 39 | 3a | 3b | 3c | 3d | 3e | 3f |
| 40 | 41 | 42 | 43 | 44 | 45 | 46 | 47 | 48 | 49 | 4a | 4b | 4c | 4d | 4e | 4f |
| 50 | 51 | 52 | 53 | 54 | 55 | 56 | 57 | 58 | 59 | 5a | 5b | 5c | 5d | 5e | 5f |
| 60 | 61 | 62 | 63 | 64 | 65 | 66 | 67 | 68 | 69 | 6a | 6b | 6c | 6d | 6e | 6f |
| 70 | 71 | 72 | 73 | 74 | 75 | 76 | 77 | 78 | 79 | 7a | 7b | 7c | 7d | 7e | 7f |
| ff | ff | ff | ff | ff | ff | ff | ff | ff | ff | ff | ff | ff | ff | ff | ff |
| 90 | 91 | 92 | 93 | 94 | 95 | 96 | 97 | 98 | 99 | 9a | 9b | 9c | 9d | 9e | 9f |
| a0 | a1 | a2 | a3 | a4 | a5 | a6 | a7 | a8 | a9 | aa | ab | ac | ad | ae | af |
| b0 | b1 | b2 | b3 | b4 | b5 | b6 | b7 | b8 | b9 | ba | bb | bc | bd | be | bf |
| c0 | c1 | c2 | c3 | c4 | c5 | c6 | c7 | c8 | c9 | ca | cb | cc | cd | ce | cf |
| d0 | d1 | d2 | d3 | d4 | d5 | d6 | d7 | d8 | d9 | da | db | dc | dd | de | df |
| e0 | e1 | e2 | e3 | e4 | e5 | e6 | e7 | e8 | e9 | ea | eb | ec | ed | ee | ef |
| f0 | f1 | f2 | f3 | f4 | f5 | f6 | f7 | f8 | f9 | fa | fb | fc | fd | fe | ff |
| ff | ff | ff | ff | ff | ff | ff | ff | ff | ff | ff | ff | ff | ff | ff | ff |

Each possible sample value in Table 2 at a position corresponding to an original sample value in Table 1 is now a value obtained by decrementing the segment number of the original sample by 1 and writing the result in hexadecimal notation. As segment numbers below the lowest segment number are not possible, instead hexadecimal ff is included in line 8 and line 16, one for positive sign and negative sign, indicating that the corresponding values correspond to 0.

Accordingly, decrementing a segment number of an original sample 00 according to the μ-law scheme corresponds to a lookup operation in Table 2 of the hexadecimal value at the same position in the table, leading to the hexadecimal value 10. Similarly, in original sample value 70 decremented by one step leads to a lookup operation in Table 2 at the same position, leading to a new sample value ff. Accordingly, if lookup tables are prepared for all possible decrement values or attenuation levels, all possible attenuation operations with all possible segment number decrements can be performed by way of lookups.

Corresponding to Table 2, Table 3 shows a lookup table of all possible sample values according to the A-law scheme and a decrement value 1, i.e., with each segment number reduced by 1 to indicate the next lower sub-range of possible signal values. Accordingly, implementing i-law and A-law coding schemes requires storage of 16 lookup tables of each 256 entries, so that the attenuating operations can be executed fully by lookup operations.

TABLE 3

Output A-law value - fading segment by one

| | | | | | | | | | | | | | | | |
|---|---|---|---|---|---|---|---|---|---|---|---|---|---|---|---|
| 10 | 11 | 12 | 13 | 14 | 15 | 16 | 17 | 18 | 19 | 1a | 1b | 1c | 1d | 1e | 1f |
| 60 | 61 | 62 | 63 | 64 | 65 | 66 | 67 | 68 | 69 | 6a | 6b | 6c | 6d | 6e | 6f |
| 30 | 31 | 32 | 33 | 34 | 35 | 36 | 37 | 38 | 39 | 3a | 3b | 3c | 3d | 3e | 3f |
| 00 | 01 | 02 | 03 | 04 | 05 | 06 | 07 | 08 | 09 | Oa | Ob | Oc | Od | Oe | Of |
| 50 | 51 | 52 | 53 | 54 | 55 | 56 | 57 | 58 | 59 | 5a | 5b | 5c | 5d | 5e | 5f |
| 55 | 55 | 55 | 55 | 55 | 55 | 55 | 55 | 55 | 55 | 55 | 55 | 55 | 55 | 55 | 55 |
| 70 | 71 | 72 | 73 | 74 | 75 | 76 | 77 | 78 | 79 | 7a | 7b | 7c | 7d | 7e | 7f |
| 40 | 41 | 42 | 43 | 44 | 45 | 46 | 47 | 48 | 49 | 4a | 4b | 4c | 4d | 4e | 4f |
| 90 | 91 | 92 | 93 | 94 | 95 | 96 | 97 | 98 | 99 | 9a | 9b | 9c | 9d | 9e | 9f |
| e0 | e1 | e2 | e3 | e4 | e5 | e6 | e7 | e8 | e9 | ea | eb | ec | ed | ee | ef |
| b0 | b1 | b2 | b3 | b4 | b5 | b6 | b7 | b8 | b9 | ba | bb | bc | bd | be | bf |
| 80 | 81 | 82 | 83 | 84 | 85 | 86 | 87 | 88 | 89 | 8a | 8b | 8c | 8d | 8e | 8f |
| d0 | d1 | d2 | d3 | d4 | d5 | d6 | d7 | d8 | d9 | da | db | dc | dd | de | df |
| 55 | 55 | 55 | 55 | 55 | 55 | 55 | 55 | 55 | 55 | 55 | 55 | 55 | 55 | 55 | 55 |
| f0 | f1 | f2 | f3 | f4 | f5 | f65 | f7 | f8 | f9 | fa | fb | fc | fd | fe | ff |
| c0 | c1 | c2 | c3 | c4 | c5 | c6 | c7 | c8 | c9 | ca | cb | cd | cd | ce | cf |

of the obtained packet determined by a position of the sample in an array or matrix of samples of the packet or defined by any other scheme. It is noted that it is not important to start the operations at a specific first sample, any sample of the packet may be defined as the starting sample, it only is required to address all samples of the packet by decrementing the respective segment number. Reading the sample for example includes reading a corresponding sample value from a memory or buffer input terminal, as known in the art. Determining the segment number includes extracting the bits of the sample or the portion of the sample defining the segment number.

In an operation 303 it is determined whether the segment number represents the lowest possible value, i.e. represents the segment number corresponding to the sub-range corresponding to the lowest signal values of the original encoded signal.

If in operation 303 the decision is "no", indicating that the segment number does not correspond to the lowest possible segment number, in an operation 304 the segment number is decremented by a predetermined decrement value. As noted earlier, the decrementing operation includes replacing the original segment number of a sample by a segment number of a sub-range a certain decrement value or step size lower than the sub-range specified by the original segment number. Thus the actual operations to be carried out for the decrementing operations depend on the numbering scheme used for designating the individual sub-ranges.

Thereafter, in operation 306 it is determined whether the last sample of the packet has been addressed, if in operation 306 the decision is "no", the flow of operations returns to operation 302, and the next sample of the obtained packet is read.

If in operation 303 the decision was "yes", indicating that the segment number already indicated the lowest possible value, in a operation 305 the segment number may be maintained at the lowest possible value. Additionally the corresponding data value may be replaced by zero or the entire sample is replaced by zero.

If in operation 306 the decision is "yes", indicating that the last sample of the packet has been addressed, the flow of operations continues, such as by obtaining a next packet, if another packet needs to be attenuated, or operations may be put on hold, if subsequent packets of a stream of packets are to be transmitted without attenuation.

Figure 3:
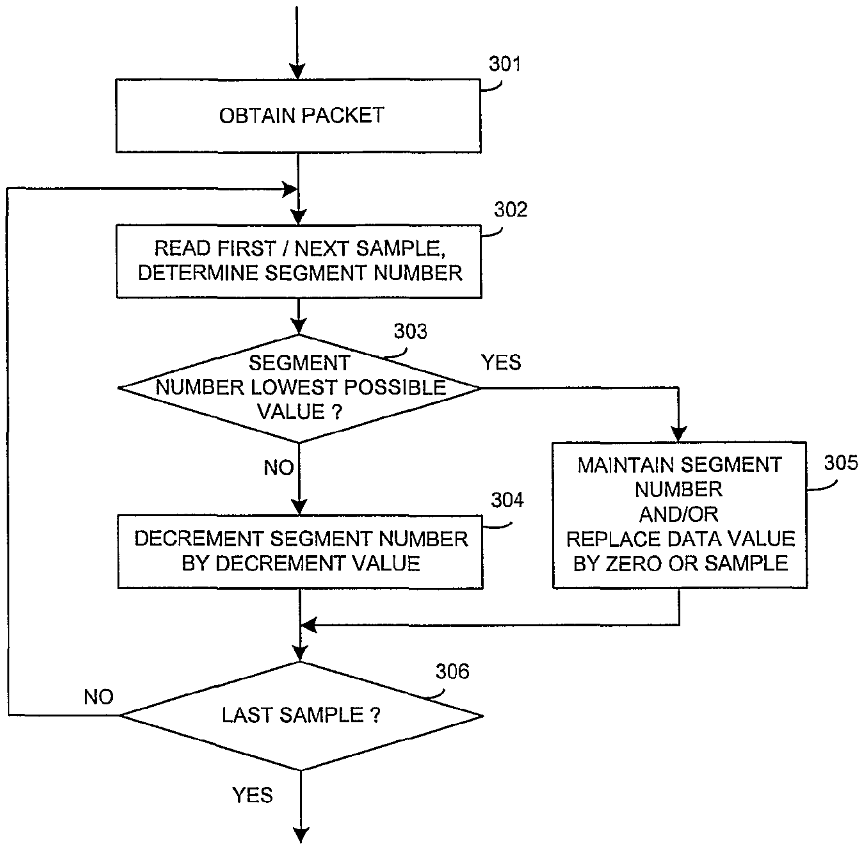
FIG. 3 illustrates operations of a method for processing packets of encoded real-time data, particularly illustrating operations to process samples of a single packet.

It is noted that the decrement value for a packet is fixed, i.e., for each sample of the packet, the same decrement value is applied. For example, in the μ- or A-law PCM coding In the following, a further embodiment of the invention will be described with regard to FIG. 3. FIG. 3 illustrates operations of a method for processing packets of encoded real-time data, particularly outlining operations for decrementing segment numbers of the samples of a packet.

As outlined before, the samples of a packet of a stream of real-time encoded data packets are attenuated to obtain a correspondingly decreased output, such as an audio output with reduced power at a speaker of a telephone. The scheme for attenuating the samples of a packet can be applied to a single packet or a sequence of packets for fading out a signal or for fading in the signal. The decrement value for the individual packets may be the same or gradually varied in order to obtain a smooth fade-out or fade-in of the signal.

In an operation 301 a packet to be attenuated is obtained. For example, this packet may associated with corresponding information that the corresponding signal values need to be attenuated, or in a pre-processing step it may be determined that the packet contains undesired information, such as a corrupted, partially corrupted signal information or noise.

In an operation 302 the first sample of the obtained packet is read. The first sample may for example be the first sample schemes with 3-bit segment numbers, the decrementing operation may correspond to selecting a segment number corresponding to the next lower sub-range of the range of original signal values, for each sample of the packet. Alternatively any other decrement value can be selected, such as a segment number corresponding to the second lower sub-range, third lower sub-range, etc.

As noted before, a sequence of packets may be attenuated by increasing or decreasing decrement values, each packet being attenuated by a larger decrement value. With a 3-bit segment number and corresponding 8 sub-ranges to be defined by the segment numbers, a segment to be attenuated by replacing each segment number by a segment number corresponding to an 8th lower sub-range, the entire packet can be set to 0, as all segment numbers will then be decremented more than the maximum value. In a practical example, if the decrementing operation for a first packet involves replacing each segment number by a segment number specifying a one step lower sub-range, after 8 packets a 0 signal can be transmitted, as this signal is completely faded out.

It is noted that in an alternative the operations 303-305 can be handled by way of lookup operations as described earlier.

Figure 4:
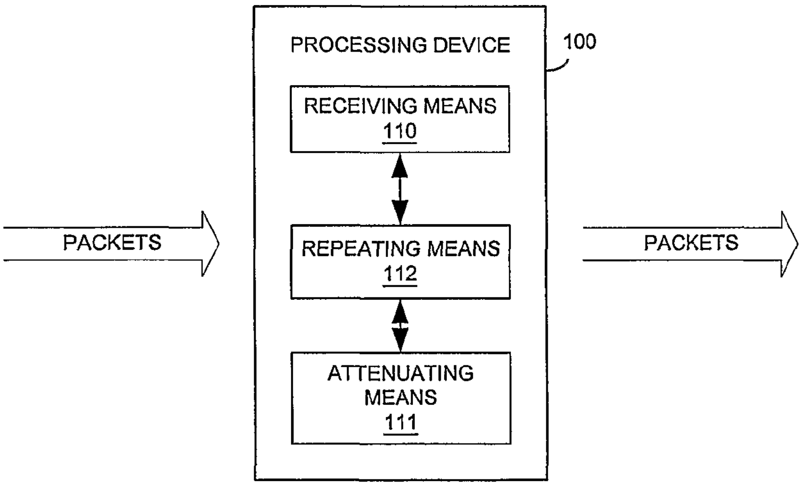
FIG. 4 illustrates elements of a processing device for processing packets of encoded real-time data, particularly illustrating fade means to attenuate copies of packets during a packet loss period.

In the following a further embodiment of the invention will be described with regard to FIG. 4. FIG. 4 illustrates elements of a processing device for processing packets of real-time encoded signals, particularly illustrating elements for packet loss concealment.

FIG. 4 illustrates a processing device 111 substantially corresponding to the processing device shown in FIG. 1, further comprising repeating means 112 for repeating data packets during a packet loss period. More precisely, the repetition means 112 is arranged to detect a packet loss period corresponding to at least one lost or improperly received packet, and the repetition means is provided for introducing into the sequence of received packets a sequence of at least one repetition copy of the last correctly received packet, in case of a packet loss detection. Thus, in order to reduce the audible effects of a packet loss period, upon the beginning of a packet loss period repetition copies of the last correctly received data packet are introduced into the sequence of packets and progressively attenuated by the attenuating means 111.

The repeating means is arranged to repeat the last correctly received data packet once or a predetermined number of times. For example, the repeating means could repeat the last correctly received packets until the end of a packet loss period, each subsequent repetition copy progressively attenuated. Correspondingly, the attenuating means is arranged to decrement the segment numbers of the sequence of repetition copies by increasing decrement values per repetition copy, to progressively attenuate each repetition copy of the sequence of repetition copies.

According to an example a first repetition copy of the last correctly received packet is attenuated by replacing the segment numbers of the packet samples by the next lower segment number by a decrement value one to specify a next lower sub-range of possible signal values. A second repetition copy of the last correctly received packet is attenuated by increasing the decrement value to two so as to specify a second lower sub-range for each sample as compared to the original sub-range. This scheme is continued by increasing the decrement value to three to specify a third lower sub-range for each sample of the next repetition copy, etc., until a maximum decrement value is reached. The maximum decrement value corresponds to a value leading to a replacement of the segment number corresponding to the highest sub-range to a segment number corresponding to the lowest sub-range. In the example of a 3-bit segment number 8 decrement values can be specified and correspondingly the maximum decrement value is 8 steps, in which case the highest samples of a packet would reach the lowest possible segment number.

After attenuating a packet by the maximum decrement value, all segment numbers reached the lowest possible value or all samples of the packet are set to zero. Accordingly a further repetition copy need not be processed, instead the last repetition copy could be repeated or packets representing zero can be forwarded representing a silence period.

If a segment number corresponds to a lowest sub-range, the next decrementing operation may correspond to replacing the data value by 0.

In the following, an illustrating example is described on the basis of an assumed packet loss period of 10 packets. Moreover, in this example it is assumed that a 3-bit segment number is provided such as in PCM RTP transmission, leading to 8 possible values for the segment numbers or sub-ranges for the signal values. Moreover, it is assumed that one bit of the sample specifies a sign value, to define positive and negative signal values.

For packet loss concealment at the beginning of the assumed packet loss period a first repetition copy of the last correctly received packet is forwarded for further processing. This first repetition copy is attenuated by a step size or decrement value one, corresponding to replacing all segment numbers of the respective samples of the packet by a segment number specifying the correspondingly next lower sub-range. Then a second repetition is forwarded, being attenuated by a decrement value of two, i.e., the segment numbers of these packets are replaced to specify the corresponding second lower sub-range. Following this procedure, the third repetition copy will be forwarded and attenuated by a decrement value of three, etc., and the 7th repetition copy is attenuated by a step size or decrement value of seven. Thereafter, as all segment numbers have now surely reached the lowest value, silence can be transmitted.

In an alternative example, the first repetition copy is not attenuated, i.e., the first repetition copy is transmitted without any attenuation, and only the second, third, etc. repetition copy is attenuated to improve the audible effect of the packet loss concealment.

According to still another alternative every two repetition copies may be attenuated by using the same decrement value, i.e. only after two repetition copies the attenuation level is increased. This procedure allows to achieve a longer fade-out period. More precisely, in this alternative the first two repetition copies of the last correctly received frame are be attenuated by one step, i.e. decrement value 1, the 3rd and 4th repetition copy are be attenuated by two steps, etc., and the 13th and 14th copy of the last correctly received frame are be attenuated by 7 steps. Thus, in order to adjust the length of the fade-out period, one or more than one repetition copies can be attenuated by the same decrement value.

Still further, the number of repetition copies to be decremented by the same decrement value may be made dependent on a real-time duration of the payload data of the packets of the stream of packets. In one example, each data packet may specify a duration of 20 ms of an original signal, while according to another example a payload data may specify 40 ms of the original signal. If in both cases the same attenuation scheme, e.g. one frame per attenuation level or two frames per attenuation level, etc. is applied, different fade-out durations will occur. In order to conform the fade-out period to different payload sizes, the number of repetition copies attenuated by the same attenuation step or decrement value is therefore made dependent on the payload duration. Generally, to obtain corresponding fade-out periods, in the case of 20 ms payload and 40 ms payload data, the number of packets attenuated by the same attenuation step for 20 ms payloads needs to be twice the number of repetition copies attenuated by the same attenuation step in the case of 40 ms payload duration.

Figure 5:
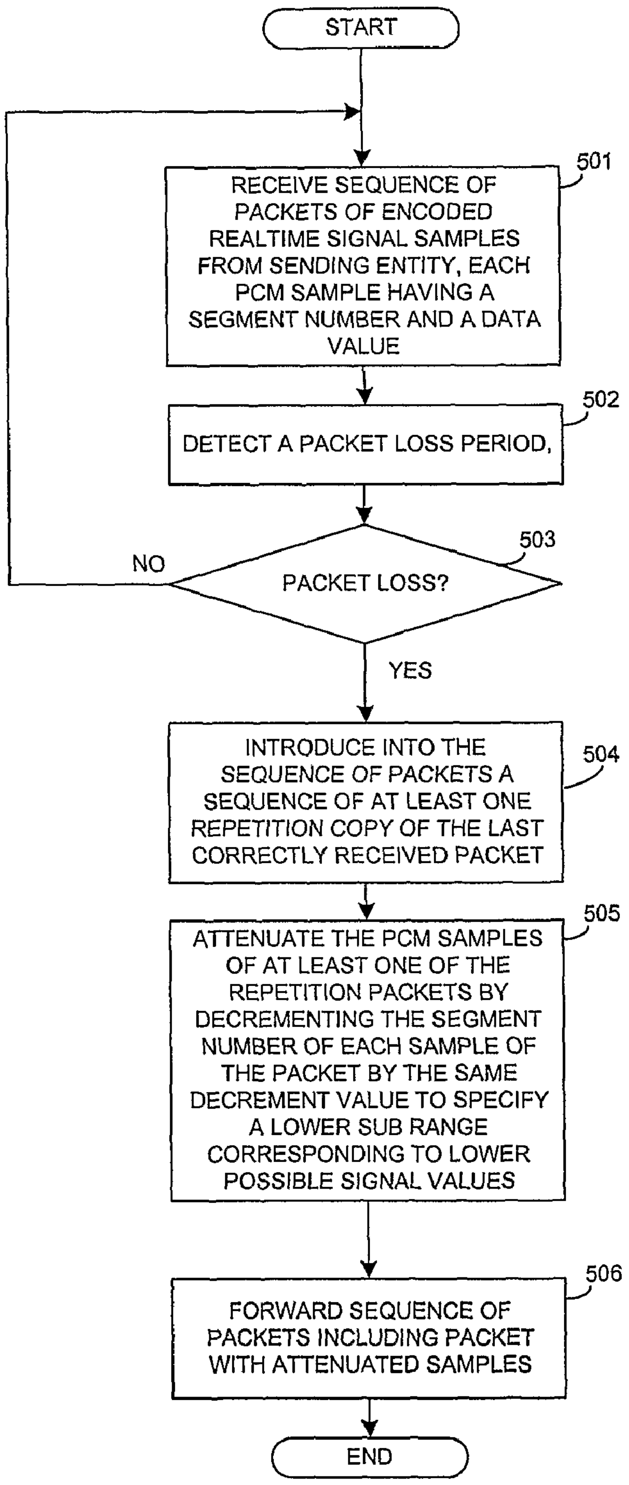
FIG. 5 illustrates operations of a method for processing packets of encoded real-time data according to an embodiment of the invention, particularly illustrating detecting a packet loss period and introducing attenuated repetition copies of a last correctly received packet.

In the following, a further embodiment of the invention will be described with regard to FIG. 5. FIG. 5 illustrates operations for processing packets of encoded real-time data, particularly illustrating operations to fade out the signal upon detecting a packet loss period.

As noted earlier, packet-switched communication networks transmit the packets individually, and based on a time stamp and sequence number the original sequence is established at the receiving entity. If due to transmission problems individual packets are lost or corrupted, the corresponding payload information is also lost, and a dropout in the reproduced signal spanning the payload duration of the missing packets occurs. For example, if five packets of 20 ms payload each are lost, a packet loss period of 100 ms occurs. One way to handle such packet loss period would be to simply pause the signal, i.e. to transmit silence during the 100 ms packet loss period, however, this will create some undesired effect at the receiver, as short periods of silence create an annoying perception for a human listener.

According to the instant embodiment, if such packet loss period is detected, the packet loss is concealed by repeating an attenuated version of the last correctly received packet. In a first operation 501 the sequence of packets of encoded real-time signal samples from the sending entity is received, such as from a party in a telephone conversation. Each sample has a segment number and a data value, as outlined with regard to previous embodiments, the segment number specifying one of a plurality of sub-ranges of possible signal values of the original signal and the data value specifying a corresponding element within the indicated sub-range. Accordingly the segment number and data value together specify a signal value of the original signal.

In an operation 502 a detection of a packet loss period is determined, the packet loss period corresponding to at least one lost or improperly received packet. For example, receiving means can be provided for monitoring the incoming stream of packets and generating a notification upon detecting missing or improperly received data packets, as known in the art. Depending on the application, packet loss periods may range up to several 10 packets, each packet for example specifying a 20 ms or 40 ms payload.

In case in operation 503 a packet loss period is confirmed, i.e., when the decision in operation 503 is "yes", in an operation 504 a sequence of at least one repetition copy of the last correctly received packet is introduced into the sequence of packets, instead of at least some of the missing packet of the packet loss period.

Moreover, in an operation 505 the samples of at least one of the repetition packets are attenuated to forward an attenuated or faded version of the repetition copy as packet loss concealment. The samples of the repetition packets are attenuated by decrementing the segment number of each sample of the packet by the same decrement value to specify a lower sub-range corresponding to lower possible signal values, as outlined with regard to previous embodiments.

According to an example, a sequence of repetition copies of the last correctly received packet is transmitted during the packet loss period, each of the repetition copies attenuated by a gradually increasing amount, i.e., by specifying progressively reduced segment numbers corresponding to lower sub-ranges as compared to the original segment numbers, to slowly fade out the signal. After a maximum number of possible attenuation steps, silence can be transmitted.

In an operation 506 the sequence of packets including the repetition copy with the attenuated samples is forwarded for further processing, such as for reproduction at a telephone, or to another network entity.

If in operation 503 the decision is "no", indicating that a packet loss was not detected, the flow returns to operation 501 and operations continue.

The embodiment described with regard to FIG. 5 enables efficient packet loss concealment by reproducing attenuated repetition copies of the last correctly received data packet to gradually fade out the signal, to reduce the audible effect of a packet loss period.

Figure 6:
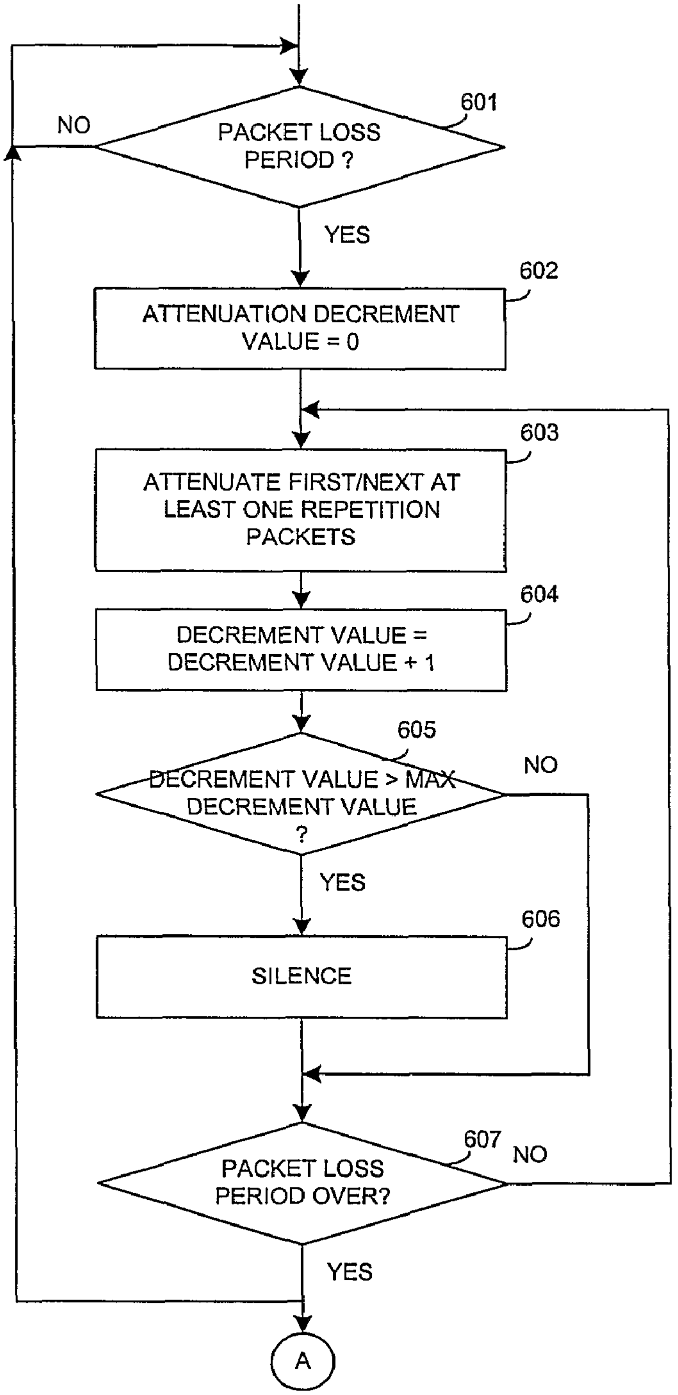
FIG. 6 illustrates operations of a method for processing packets of encoded real-time data according to another embodiment of the invention, particularly illustrating operations to attenuate samples of packets.

In the following, a further embodiment of the invention will be described with regard to FIG. 6. FIG. 6 illustrates operations for processing packets of encoded real-time data, particularly outlining operations to progressively attenuate a sequence of repetition copies of the last correctly received packet.

In a first operation 601 a packet loss period is determined. If in operation 601 the decision is "yes", in an operation 602 the attenuation decrement value is initialised to 0. It is noted that initialising the decrement value to 0 corresponds to initialising the decrement value to a defined initial value that may be "no decrement" or any "initial decrement".

In operation 603 the first repetition copy of the last correctly received packet is attenuated by the decrement value, as outlined with regard to previous embodiments. Briefly, as outlined before, each sample of the corresponding packet is read and the segment numbers are decremented by the decrement value or, if the segment number already corresponds to a lowest possible sub-range, the segment number may be maintained and/or the corresponding data value is replaced by 0 or the entire sample.

Thereafter, in operation 604 the decrement value is incremented by 1. Incrementing by 1 corresponds to increasing the decrement value and corresponds to setting a certain attenuation step size or level, whereby the increase value 1 stands for a selected unit step size, which may not necessarily correspond to the number 1.

In an operation 605 it is detected whether the decrement value exceeds a maximum decrement value. The maximum decrement value depends on the number of possible segment numbers, in the case of PCM A-law and μ-law coding, 8 segment numbers are available and correspondingly the maximum decrement value is 8. However, it is noted that other coding schemes may provide for a larger number of segment numbers, in which case the maximum decrement value would correspond to the respective higher number. If in operation 605 the decision is "yes", indicating that the decrement value exceeds the maximum decrement value, it is known that all samples of a corresponding repetition copy will be necessarily have reached the lowest possible value, and instead of continuing transmitting repetition copies in an operation 606, silence is generated. Thereafter, or in case the decision in operation 605 was "no", indicating that the decrement value is not larger than the maximum decrement value, in an operation 607 it is determined whether the packet loss period is over. If the decision is "no", the flow of operations returns to operation 603, and the decrement value is further increased to process the next repetition copy transmitted during the packet loss period with the next attenuation step in operations 604-606.

If in operation 607 the decision is "yes", indicating that the packet loss period is over, normal transmission resumes and the flow continues with operation 601.

FIG. 6 illustrates an embodiment to slowly fade out a sequence of packets having a packet loss period by transmitting a sequence of repetition copies during the packet loss period, the repetition copies being attenuated by gradually increased values, until the signal is completely faded out.

Figure 7:
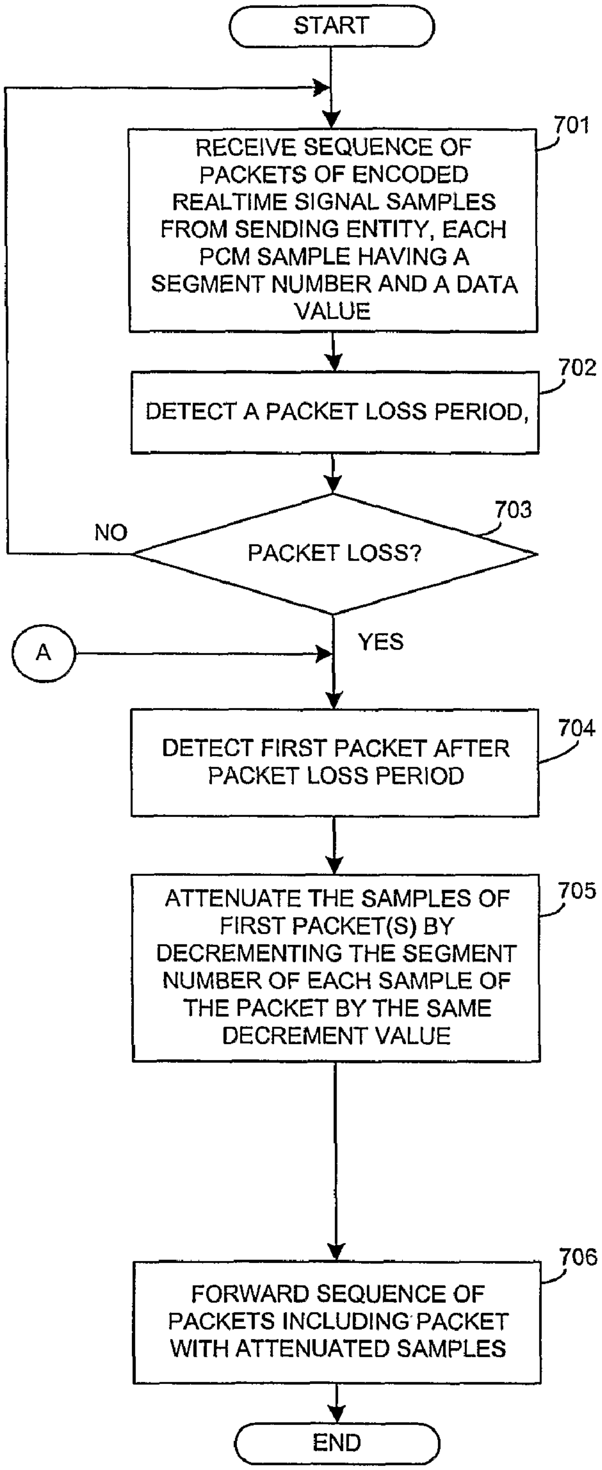
FIG. 7 illustrates operations of a method for processing packets of real-time encoded data according to another embodiment of the invention, particularly illustrating operations to fade in a signal after a packet loss period.

In the following, a further embodiment of the invention will be described with regard to FIG. 7. FIG. 7 illustrates operations for processing packets of encoded real-time data, particularly illustrating operations for fading in a signal after the end of a packet loss period.

As described earlier, a signal dropout during a packet loss period can be concealed by transmitting repetition copies of the last correctly received packet, each of the repetition copies attenuated by using a gradually increased decrement value until the signal is completely faded out. Accordingly, the signal slowly fades out and annoying audible effects can be reduced. Similarly, if after a packet loss period the signal abruptly reappears, an undesired audible effect is created, and it is desirable to slowly fade in the signal after a packet loss period. Generally, the same technique as used for fading out the signal can be used for fading in the signal after the packet loss period, by attenuating the first packets of the reappearing stream of packets by slowly decreased attenuation values.

In a first operation 701 a sequence of packets of encoded real-time signal samples is received from a sending entity, each sample having a second number and a data value, as outlined with regard to previous embodiments.

In an operation 702 a packet loss period is detected, e.g. by monitoring the sequence numbers and time stamps of the packets.

In an operation 703 it is determined whether a packet loss period occurred. If the decision is "no", indicating that no packet loss occurred, the flow returns to operation 701, and normal receiving operations and processing/forwarding operations are carried out, as outlined before.

If in operation 703 the decision is "yes", indicating that a packet loss period occurred, in an operation 704 a first packet after end of the packet loss period is detected, i.e., the first packet of the stream of packets again correctly received is determined.

In an operation 705 the samples of this first packet are attenuated by decrementing the segment number of each sample of the packet by the same decrement value. The attenuation operation is as outlined with regard to previous embodiments with the difference that it is not a repetition copy of a packet that is attenuated, but the first packet after the end of a packet loss period.

Analogous to the previous embodiments the segment numbers for a sequence of packets after the drop out period can be attenuated by decreasing levels, i.e. the decrement values of a sequence of packets after the packet loss period can be gradually decreased.

Additionally, the sample segment numbers of at least one packet after the packet loss period may be decremented by the same decrement value and, the number of the packets decremented by the same decrement value may depend on the real-time duration of the payload data of a packet, as described earlier for packet loss concealment.

In an operation 706 the sequence of packets including the attenuated first packet after end of the packet loss period is forwarded to another network entity or receiver, as outlined before.

In an alternative operation 705 not only the first packet of the sequence of packets of the packet loss period can be attenuated, but also a larger number of packets, such as the 1st-5th packet, with each packet containing a 20 or 40 ms payload of the original signal. In this case, the attenuation of the first packet will be largest, the attenuation selected for the second packet reduced and further slowly reduced to 0 for the next number of packets. In a practical example the decrement value for the first packet after the packet loss period will be largest, the decrement value for the second packet and following packets slowly reduced until packets without any attenuation are transmitted.

Accordingly, after a packet loss period, the signal can be slowly faded in order to reduce the audible impact of a reappearing signal after a packet loss period.

The previously described embodiments for fading out the signal by transmitting attenuated repetition copies of the last correctly received data packet at the beginning of a packet loss period and the embodiments for transmitting attenuated packets after a packet loss period may be combined to achieve a slow fade-out of the signal upon the beginning of a packet loss period, and for slowly fading in the signal again after the end of the packet loss period.

According to an example, the flow of operations following operation 607 in FIG. 6, denoted by an exit point A, may continue with operation 704 of FIG. 7, as indicated at the entry point A in FIG. 7.

According to an alternative to attenuating packets after a packet loss period to smoothly fade in the signal, it is also conceivable to perform operations 705 and 706 at the beginning of a signal stream, e.g. upon receiving a first packet in a newly established communication or after a silence period in an ongoing communication, e.g. if a user did not speak for a certain period of time.

Figure 8:
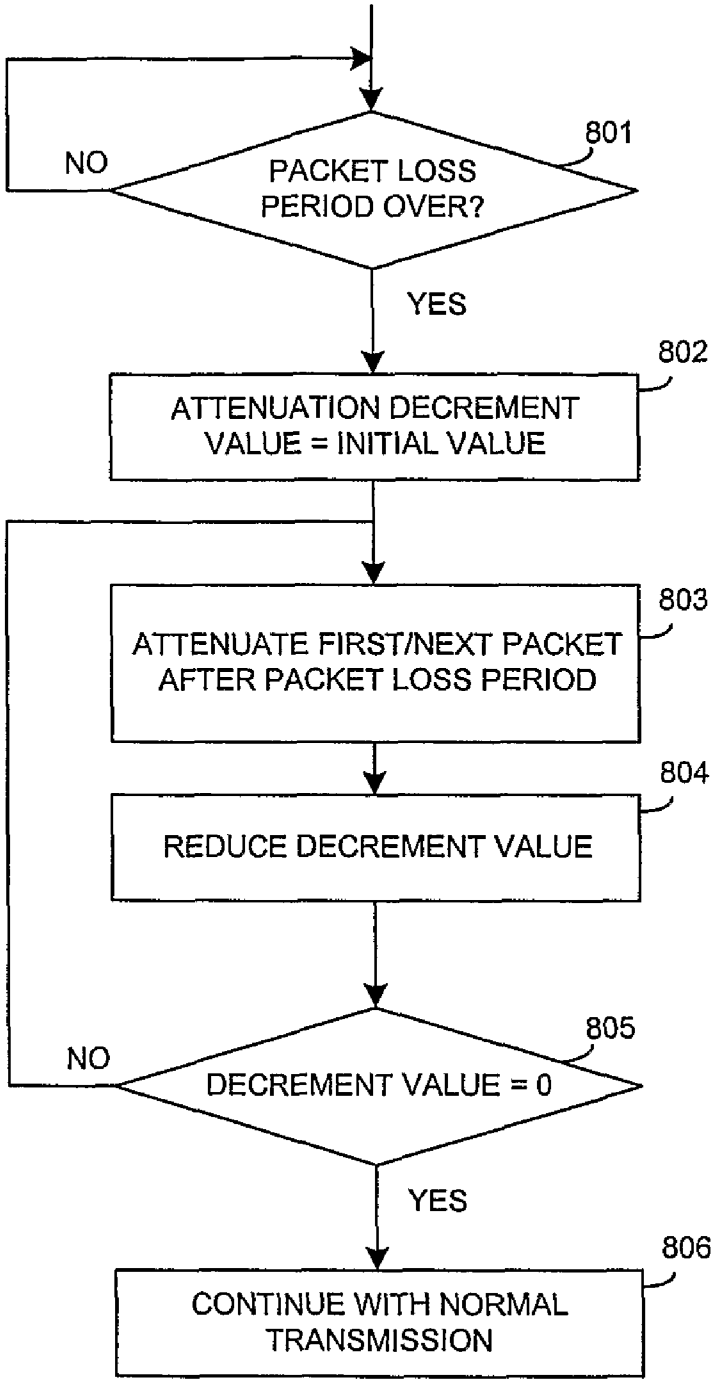
FIG. 8 illustrates operations of a method for processing packets of real-time encoded data according to another embodiment of the invention, particularly illustrating attenuating a sequence of packets after a packet loss period by progressively reduced decrement values to fade in the signal.

In the following, a further embodiment of the invention will be described with regard to FIG. 8. FIG. 8 illustrates operations for processing packets of encoded real-time data, particularly illustrating operations to slowly fade in a signal after a packet loss period, such as outlined with regard to FIG. 8.

In a first operation 801 it is determined whether a packet loss period is over, and if in operation 801 the packet loss period is determined over, in operation 802 the attenuation decrement value is set to an initial value, specifying an initial decrement value for attenuating the first data packet after the packet loss period ends. According to an example, the initial value for the attenuation may be a maximum possible decrement value, to start the reappearing signal at for example low power.

In an operation 803 the first packet after the packet loss period is attenuated using the initial decrement value, by decrementing each segment number of each sample of the packet by the initial decrement value, as outlined before. Alternatively, as outlined before, also two or more packets may be attenuated the same decrement value and, the number of the packets decremented by the same decrement value may depend on the real-time duration of the payload data of a packet, as described earlier for packet loss concealment.

After attenuating all samples of the packet, the decrement value is reduced, so as to specify a lower decrement value or attenuation level for a next packet after the packet loss period.

In an operation 802 it is determined whether the decrement value is equal to 0. If in operation 805 the decision is "no", the next packet after the packet loss period is attenuated using the reduced decrement value of operation 804. This sequence of operations 803, 804 and 805 is continued until the decrement value is equal to 0. In operation 804 for each iteration reduces the decrement value, preferably so as to achieve a smooth fade-in of the signal, for example the decrement value may be reduced each iteration by one attenuation level until the decrement value is equal to 0.

If in operation 805 the decision is "yes", normal transmissions are continued in an operation 806.

As the fade-in of the reappearing flow of packets is performed by attenuating the first packets of the reappearing stream by progressively decrease attenuation levels, quick fade-in is desired, as the attenuated packets do not contain repetition copies such as in the fade-out process, but payload data of the reappearing signal.

A program may be provided comprising instructions to carrying out the method of any of the above embodiments. This program may be provided on a computer-readable medium to be loaded into a computing device and causing the computing device to execute the operations of the above outlined methods. Moreover, a computer program product may be provided comprising the computer-readable medium.

The above embodiments may be realized by a general purpose processing device executing the operations as defined by the program, or by a combination of a general purpose processing device, dedicated hardware, or fully by a dedicated hardware device.

The invention claimed is:

1. A processing device for processing packets of encoded real-time data to produce a gradual fade-out or fade-in of a received signal, said processing device comprising:

receiving means for receiving a sequence of packets of encoded real-time signal samples from a sending entity, each sample having a segment number and a data value, the segment number specifying one of a plurality of adjacent sub ranges of a range of possible signal amplitude values, and the data value indicating an element in the sub range specified by the segment number; and attenuating means for attenuating the samples of a packet by decrementing the segment number of each sample of the packet by the same decrement value to specify a lower sub range corresponding to lower possible signal amplitude values.

2. The processing device according to claim 1, further comprising:

repetition means for detecting a packet loss period, the packet loss period corresponding to at least one lost or improperly received packet, and for introducing into the sequence of packets a sequence of at least one repetition copy of the last correctly received packet, if a packet loss period is detected; and wherein the packet attenuated by the attenuating means is a repetition copy.

3. The processing device according to claim 2, wherein the attenuating means includes means for progressively decrementing the segment numbers for the sequence of repetition copies by increasing decrement values.

4. The processing device according to claim 2, wherein a segment number corresponds to a lowest sub range, and the attenuating means includes means for replacing the data value with zero.

5. The processing device according to claim 2, wherein the attenuating means includes means for decrementing sample segment numbers of at least one repetition copy by the same decrement value.

6. The processing device according to claim 5, wherein the means for decrementing sample segment numbers of at least one repetition copy by the same decrement value includes means for determining the number of repetition copies to decrement by the same decrement value based on the real-time duration of the payload data of a packet.

7. The processing device according to claim 2, wherein the attenuating means does not attenuate the first repetition copy.

8. The processing device according to claim 1, wherein the receiving means includes:

means for detecting a first packet after a packet loss period; and wherein the packet attenuated by the attenuating means is the first packet after the packet loss period.

9. The processing device according to claim 8, wherein the attenuating means includes means for decrementing the segment numbers of the samples of packets subsequent to the first packet after the packet loss period by a smaller decrement value compared to the first packet.

10. The processing device according to claim 1, wherein the attenuating means includes a lookup table of all possible sample values for each attenuation decrement value, wherein the attenuating means attenuates the samples by looking up a sample value at a position corresponding to an original sample value in a lookup table corresponding to a desired attenuation decrement value.

11. A method of processing packets of encoded real-time data to produce a gradual fade-out or fade-in of a received signal, said method comprising the steps of:

receiving a sequence of packets of encoded real-time signal samples from a sending entity, each sample having a segment number and a data value, the segment number specifying one of a plurality of adjacent sub ranges of a range of possible signal amplitude values, and the data value indicating an element in the sub range specified by the segment number; and attenuating the samples of a packet by decrementing the segment number of each sample of the packet by the same decrement value to specify a lower sub range corresponding to lower possible signal amplitude values.

12. The method according to claim 11, further comprising the steps of:

detecting a packet loss period, the packet loss period corresponding to at least one lost or improperly received packet;

introducing into the sequence of packets, a sequence of at least one repetition copy of the last correctly received packet, if a packet loss period is detected; and wherein the packet attenuated by the attenuating means is a repetition copy.

13. The method according to claim 12, wherein the attenuating step includes decrementing the segment numbers for the sequence of repetition copies by increasing decrement values.

14. The method according to claim 12, further comprising replacing the data value by zero, if a segment number corresponds to a lowest sub range.

15. The method according to claim 12, wherein the attenuating step includes decrementing sample segment numbers of at least one repetition copy by the same decrement value.

16. The method according to claim 12, wherein the first repetition copy is not attenuated.

17. The method according to claim 11, further comprising detecting a first packet after a packet loss period, and wherein the attenuating step includes attenuating the first packet after the packet loss period.

18. The method according to claim 17, wherein the attenuating step includes decrementing the segment numbers of the samples of packets subsequent to the first packet after the packet loss period by a smaller decrement value compared to the first packet.

19. The method according to claim 11, further comprising:

storing a lookup table of all possible sample values for each attenuation decrement value; and wherein the attenuating step includes attenuating the samples by looking up a sample value at a position corresponding to an original sample value in a lookup table corresponding to a desired attenuation decrement value.

20. A method of processing packets of encoded real-time data to produce a gradual fade-out or fade-in of a received signal, said method comprising the steps of:

receiving a sequence of packets of encoded real-time signal samples from a sending entity, each sample having a segment number and a data value, the segment number specifying one of a plurality of adjacent sub ranges of a range of possible signal amplitude values, and the data value indicating an element in the sub range specified by the segment number;

detecting a packet loss period having a beginning and an end, the packet loss period corresponding to at least one lost or improperly received packet;

producing a gradual fade-out of the received signal at the beginning of the packet loss period by:

replicating a last correctly received packet; and attenuating the samples of the replicated packet by decrementing the segment number of each sample of the replicated packet by the same decrement value to specify a lower sub range corresponding to a lower signal amplitude value;

detecting a first correctly received packet after the packet loss period;

producing a gradual fade-in of the received signal at the end of the packet loss period by:

attenuating the samples of the first correctly received packet after the packet loss period by decrementing the segment number of each sample of the first correctly received packet by the same decrement value to specify a lower sub range corresponding to a first signal amplitude value;

replicating the first correctly received packet after the packet loss period; and attenuating the samples of the replicated packet by decrementing the segment number of each sample of the replicated packet by the a decrement value to specify a lower sub range corresponding to a second signal amplitude value higher than the first signal amplitude value.

* * * * *